United States Patent
Redding

(10) Patent No.: US 9,979,223 B2
(45) Date of Patent: May 22, 2018

(54) SYSTEM AND METHOD FOR WIRELESS POWER CONTROL COMMUNICATION USING BLUETOOTH LOW ENERGY

(71) Applicant: QUALCOMM Incorporated, San Diego, CA (US)

(72) Inventor: Brian A. Redding, Urbana, IL (US)

(73) Assignee: QUALCOMM Incorporated, San Diego, CA (US)

(*) Notice: Subject to any disclaimer, the term of this patent is extended or adjusted under 35 U.S.C. 154(b) by 0 days. days.

(21) Appl. No.: 15/249,141

(22) Filed: Aug. 26, 2016

(65) Prior Publication Data

US 2016/0365747 A1 Dec. 15, 2016

Related U.S. Application Data

(62) Division of application No. 13/678,455, filed on Nov. 15, 2012, now Pat. No. 9,431,844.

(Continued)

(51) Int. Cl.
*H01M 10/44* (2006.01)
*H01M 10/46* (2006.01)
(Continued)

(52) U.S. Cl.
CPC ............. *H02J 7/025* (2013.01); *H01M 10/46* (2013.01); *H02J 5/005* (2013.01); *H02J 7/00* (2013.01);
(Continued)

(58) Field of Classification Search
CPC .......... H02J 5/005; H02J 7/025; H02J 7/0021; H02J 7/0042; H02J 7/355
(Continued)

(56) References Cited

U.S. PATENT DOCUMENTS 6,446,199 B1 9/2002 Howe et al.
7,375,492 B2 5/2008 Calhoon et al.
(Continued)

FOREIGN PATENT DOCUMENTS

CN 101645619 A 2/2010
CN 101983467 A 3/2011
(Continued)

OTHER PUBLICATIONS

International Search Report and Written Opinion—PCT/US2013/033890—ISA/EPO—dated Oct. 15, 2013.
(Continued)

*Primary Examiner* — Edward Tso
(74) *Attorney, Agent, or Firm* — Knobbe, Martens, Olson & Bear, LLP

(57) ABSTRACT

This disclosure provides systems, methods, and apparatus for connecting with a charging device via a wireless communications network. In one aspect, a wireless charger comprises a transmitter configured to transmit a power signal. The wireless charger further comprises a device scanner configured to scan for one or more connection solicitations transmitted by devices. The wireless charger further comprises a receiver configured to receive a connection solicitation via the wireless communications network from the charging device in response to the transmitted power signal. The transmitter may be configured to transmit a connection request to establish a connection with the charging device in response to the received connection solicitation.

34 Claims, 12 Drawing Sheets

Related U.S. Application Data

(60) Provisional application No. 61/619,760, filed on Apr. 3, 2012.

(51) Int. Cl.

| | | |
|---|---|---|
| *H02J 7/02* | (2016.01) | |
| *H02J 7/00* | (2006.01) | |
| *H02J 50/12* | (2016.01) | |
| *H02J 50/60* | (2016.01) | |
| *H02J 5/00* | (2016.01) | |
| *H04B 5/00* | (2006.01) | |
| *H04W 12/06* | (2009.01) | |
| *H02J 50/80* | (2016.01) | |
| *H02J 50/90* | (2016.01) | |
| *H02J 7/04* | (2006.01) | |
| *H04R 25/00* | (2006.01) | |

(52) U.S. Cl.
CPC ............ *H02J 7/0004* (2013.01); *H02J 7/007* (2013.01); *H02J 7/045* (2013.01); *H02J 50/12* (2016.02); *H02J 50/60* (2016.02); *H02J 50/80* (2016.02); *H02J 50/90* (2016.02); *H04B 5/0037* (2013.01); *H04W 12/06* (2013.01); *H02J 2007/0001* (2013.01); *H02J 2007/0049* (2013.01); *H02J 2007/0096* (2013.01); *H04R 25/55* (2013.01)

(58) Field of Classification Search
USPC ............... 320/107, 108, 114, 128, 132, 149; 307/104
See application file for complete search history.

(56) References Cited

U.S. PATENT DOCUMENTS

| | | | |
|---|---|---|---|
| 7,893,564 | B2 | 2/2011 | Bennett |
| 8,723,642 | B2 | 5/2014 | Park et al. |
| 9,124,122 | B2 | 9/2015 | Kim et al. |
| 9,407,106 | B2 | 8/2016 | Redding et al. |
| 9,431,844 | B2 | 8/2016 | Redding et al. |
| 9,525,209 | B2 | 12/2016 | Tanabe et al. |
| 2006/0184705 | A1 | 8/2006 | Nakajima |
| 2007/0032098 | A1 | 2/2007 | Bowles |
| 2009/0001932 | A1* | 1/2009 | Kamijo ................... H02J 5/005 320/108 |
| 2009/0174264 | A1 | 7/2009 | Onishi et al. |
| 2010/0036773 | A1* | 2/2010 | Bennett ............. G06Q 20/3674 705/67 |
| 2010/0066305 | A1 | 3/2010 | Takahashi et al. |
| 2010/0151808 | A1 | 6/2010 | Toncich et al. |
| 2010/0225173 | A1 | 9/2010 | Aoyama et al. |
| 2010/0225270 | A1 | 9/2010 | Jacobs et al. |
| 2010/0264746 | A1 | 10/2010 | Kazama et al. |
| 2010/0277003 | A1 | 11/2010 | Von et al. |
| 2011/0025264 | A1 | 2/2011 | Mochida et al. |
| 2011/0025265 | A1 | 2/2011 | Mochida et al. |
| 2011/0078092 | A1 | 3/2011 | Kim et al. |
| 2011/0119144 | A1 | 5/2011 | Grilli et al. |
| 2011/0221389 | A1 | 9/2011 | Won et al. |
| 2011/0221390 | A1 | 9/2011 | Won et al. |
| 2011/0221391 | A1 | 9/2011 | Won et al. |
| 2011/0248668 | A1 | 10/2011 | Davis et al. |
| 2011/0279226 | A1 | 11/2011 | Chen et al. |
| 2011/0285213 | A1 | 11/2011 | Kowalewski |
| 2012/0052923 | A1 | 3/2012 | Park |
| 2012/0098485 | A1 | 4/2012 | Kang et al. |
| 2012/0290470 | A1 | 11/2012 | Lee et al. |
| 2012/0306285 | A1 | 12/2012 | Kim et al. |
| 2012/0326524 | A1 | 12/2012 | Matsumoto et al. |
| 2013/0257365 | A1 | 10/2013 | Redding |
| 2014/0159646 | A1 | 6/2014 | Sankar et al. |

FOREIGN PATENT DOCUMENTS

| | | |
|---|---|---|
| EP | 1734635 A2 | 12/2006 |
| JP | 2009011129 A | 1/2009 |
| JP | 2009189230 A | 8/2009 |
| JP | 2009247125 A | 10/2009 |
| JP | 2010011650 A | 1/2010 |
| JP | 2010104203 A | 5/2010 |
| JP | 2010213414 A | 9/2010 |
| JP | 2010239781 A | 10/2010 |
| JP | 2011116246 A | 6/2011 |
| JP | 2011152008 A | 8/2011 |
| JP | 2012055045 A | 3/2012 |
| JP | 2012065419 A | 3/2012 |
| KR | 1019970003058 | 1/1997 |
| WO | WO-2010104803 A1 | 9/2010 |
| WO | WO-2011132507 A1 | 10/2011 |
| WO | WO-2012037279 A1 | 3/2012 |

OTHER PUBLICATIONS

Partial International Search Report—PCT/US2013/033890—ISA/EPO—dated Jul. 24, 2013.

* cited by examiner

SYSTEM AND METHOD FOR WIRELESS POWER CONTROL COMMUNICATION USING BLUETOOTH LOW ENERGY

CROSS-REFERENCE TO RELATED APPLICATIONS

This application is a divisional of U.S. patent application Ser. No. 13/678,455, entitled "SYSTEM AND METHOD FOR WIRELESS POWER CONTROL COMMUNICATION USING BLUETOOTH LOW ENERGY" and filed on Nov. 15, 2012, which claims priority under 35 U.S.C. § 119(e) to U.S. Provisional Patent Application No. 61/619,760, entitled "SYSTEM AND METHOD FOR WIRELESS POWER CONTROL COMMUNICATION USING BLUETOOTH LOW ENERGY" and filed on Apr. 3, 2012, the entire contents of which disclosures are herewith incorporated by reference.

FIELD

The present invention relates generally to wireless power. More specifically, the disclosure is directed to establishing a connection between a wireless charging and a charging device using Bluetooth Low Energy.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless charger for connecting with a charging device via a wireless communications network. The wireless charger comprises a transmitter configured to transmit a power signal. The wireless charger further comprises a device scanner configured to scan for one or more connection solicitations transmitted by devices. The wireless charger further comprises a receiver configured to receive a connection solicitation via the wireless communications network from the charging device in response to the transmitted power signal. The transmitter may be configured to transmit a connection request to establish a connection with the charging device in response to the received connection solicitation.

Another aspect of the disclosure provides a method for connecting with a charging device wirelessly via a wireless communications network. The method comprises transmitting a power signal. The method further comprises scanning for one or more connection solicitations transmitted by devices. The method further comprises receiving a connection solicitation via the wireless communications network from the charging device in response to the transmitted power signal. The method further comprises transmitting a connection request to establish a connection with the charging device in response to the received connection solicitation.

Another aspect of the disclosure provides an apparatus for connecting with a charging device via a wireless communications network. The apparatus comprises means for transmitting a power signal. The apparatus further comprises means for scanning for one or more connection solicitations transmitted by devices. The apparatus further comprises means for receiving a connection solicitation via the wireless communications network from the charging device in response to the transmitted power signal. The apparatus further comprises means for transmitting a connection request to establish a connection with the charging device in response to the received connection solicitation.

Another aspect of the disclosure provides a non-transitory computer-readable medium comprising code that, when executed, causes an apparatus to transmit a power signal. The medium further comprises code that, when executed, causes an apparatus to scan for one or more connection solicitations transmitted by devices. The medium further comprises code that, when executed, causes an apparatus to receive a connection solicitation via a wireless communications network from the charging device in response to the transmitted power signal. The medium further comprises code that, when executed, causes an apparatus to transmit a connection request to establish a connection with the charging device in response to the received connection solicitation.

Another aspect of the disclosure provides a charging device for connecting with a wireless charger via a wireless communications network. The charging device comprises a receiver configured to receive a power signal transmitted by the wireless charger. The charging device further comprises a processor configured to generate a connection solicitation in response to the power signal being received. The charging device further comprises a transmitter configured to transmit the connection solicitation via the wireless communications network. The receiver may be configured to receive a connection request to establish a connection with the wireless charger in response to the transmitted connection solicitation.

Another aspect of the disclosure provides a method for connecting with a wireless charger via a wireless communications network. The method comprises receiving a power signal transmitted by the wireless charger. The method further comprises generating a connection solicitation in response to the power signal being received. The method further comprises transmitting the connection solicitation via the wireless communications network. The method further comprises receiving a connection request to establish a connection with the wireless charger in response to the transmitted connection solicitation.

Another aspect of the disclosure provides an apparatus for connecting with a wireless charger via a wireless communications network. The apparatus comprises means for receiving a power signal transmitted by the wireless charger. The apparatus further comprises means for generating a connection solicitation in response to the power signal being received. The apparatus further comprises means for transmitting the connection solicitation via the wireless communications network. The apparatus further comprises means for receiving a connection request to establish a connection with the wireless charger in response to the transmitted connection solicitation.

Another aspect of the disclosure provides a non-transitory computer-readable medium comprising code that, when executed, causes an apparatus to receive a power signal transmitted by the wireless charger. The medium further comprises code that, when executed, causes an apparatus to generate a connection solicitation in response to the power signal being received. The medium further comprises code that, when executed, causes an apparatus to transmit the connection solicitation via a wireless communications network. The medium further comprises code that, when executed, causes an apparatus to receive a connection request to establish a connection with the wireless charger in response to the transmitted connection solicitation.

Figure 1:
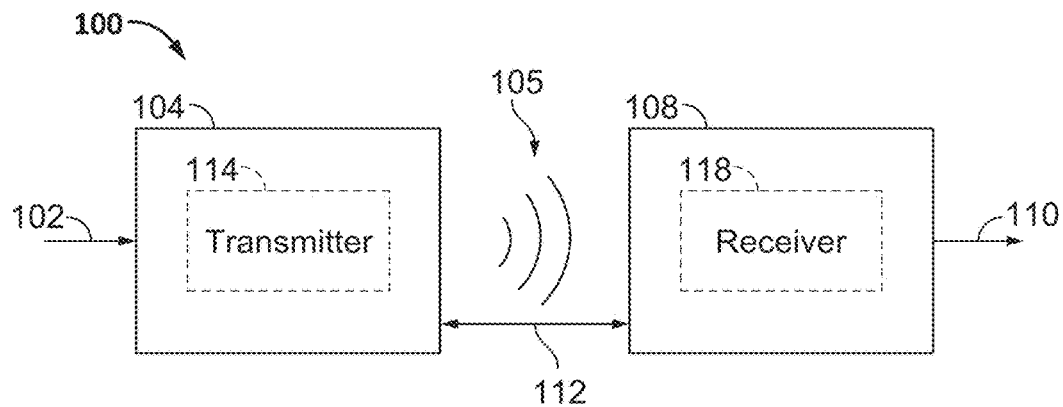
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
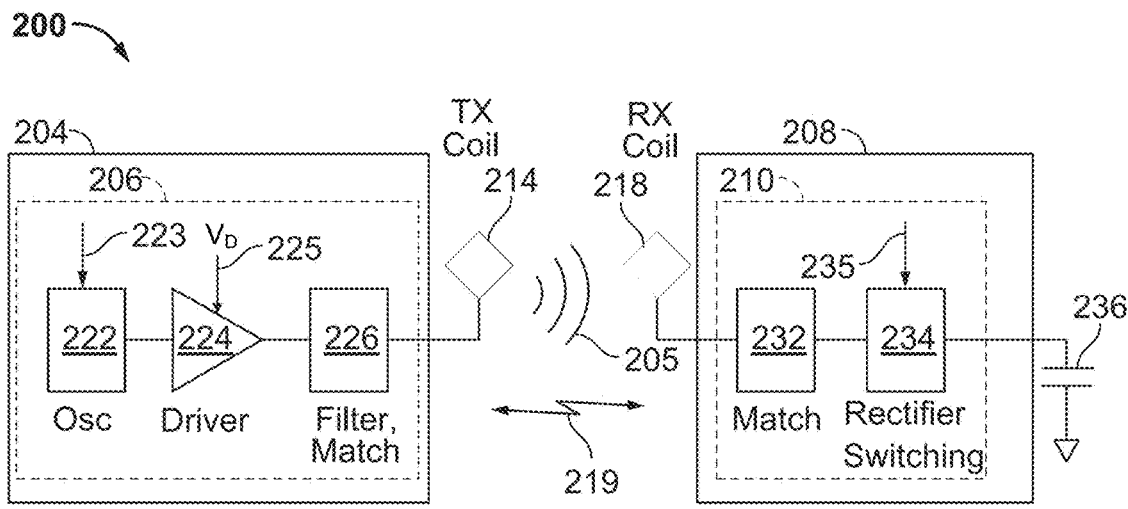
FIG. 2 is a functional block diagram of exemplary components that may be used in the wireless power transfer system of FIG. 1, in accordance with various exemplary embodiments.

FIG. 2 is a functional block diagram of exemplary components that may be used in the wireless power transfer system 100 of FIG. 1, in accordance with various exemplary embodiments. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
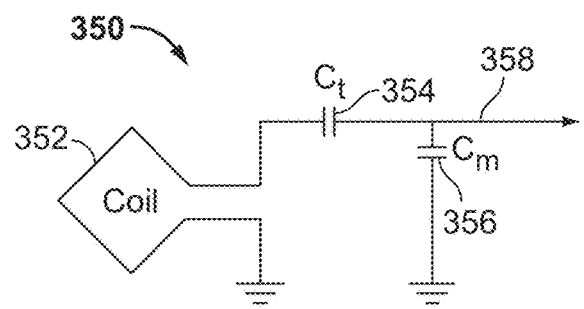
FIG. 3 is a schematic diagram of a portion of transmit circuitry or receive circuitry of FIG. 2 including a transmit or receive coil, in accordance with exemplary embodiments.

FIG. 3 is a schematic diagram of a portion of transmit circuitry 206 or receive circuitry 210 of FIG. 2 including a transmit or receive coil 352, in accordance with exemplary embodiments. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
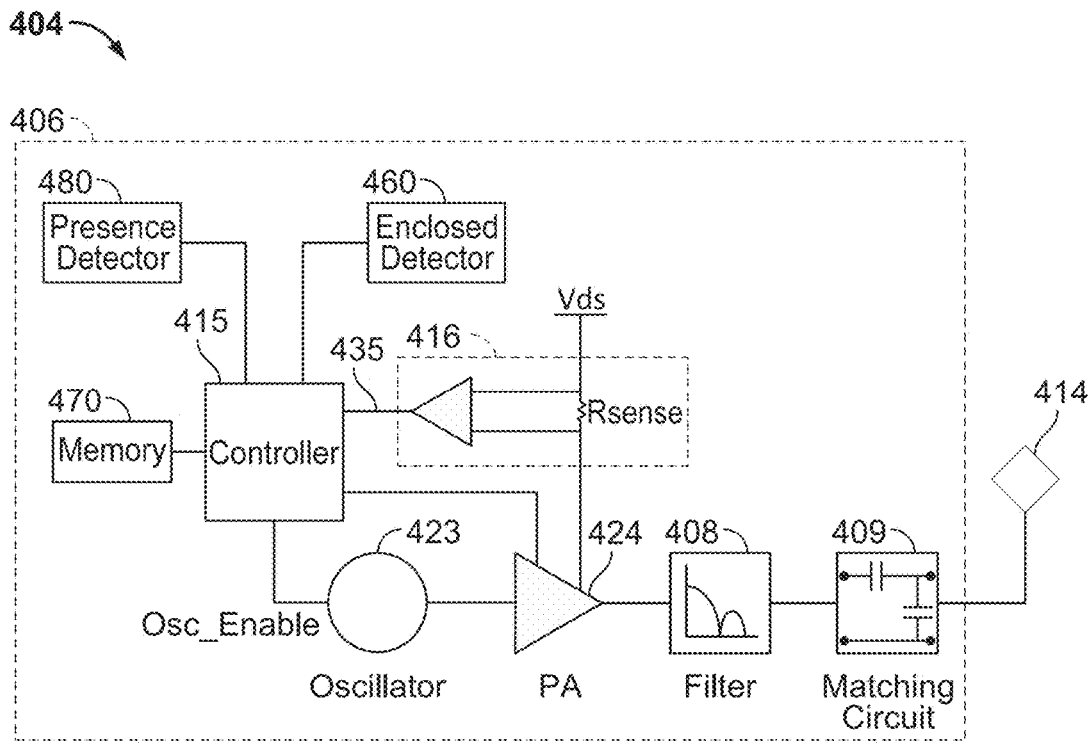
FIG. 4 is a functional block diagram of a transmitter that may be used in the wireless power transfer system of FIG. 1, in accordance with exemplary embodiments.

FIG. 4 is a functional block diagram of a transmitter 404 that may be used in the wireless power transfer system of FIG. 1, in accordance with exemplary embodiments. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
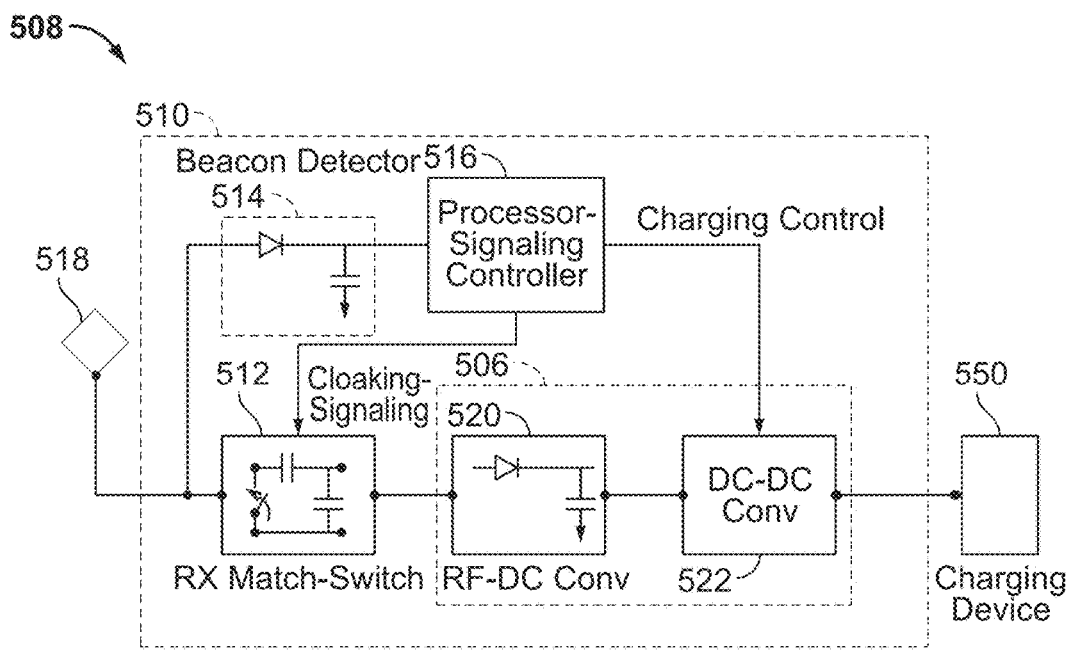
FIG. 5 is a functional block diagram of a receiver that may be used in the wireless power transfer system of FIG. 1, in accordance with exemplary embodiments.

FIG. 5 is a functional block diagram of a receiver 508 that may be used in the wireless power transfer system of FIG. 1, in accordance with exemplary embodiments. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
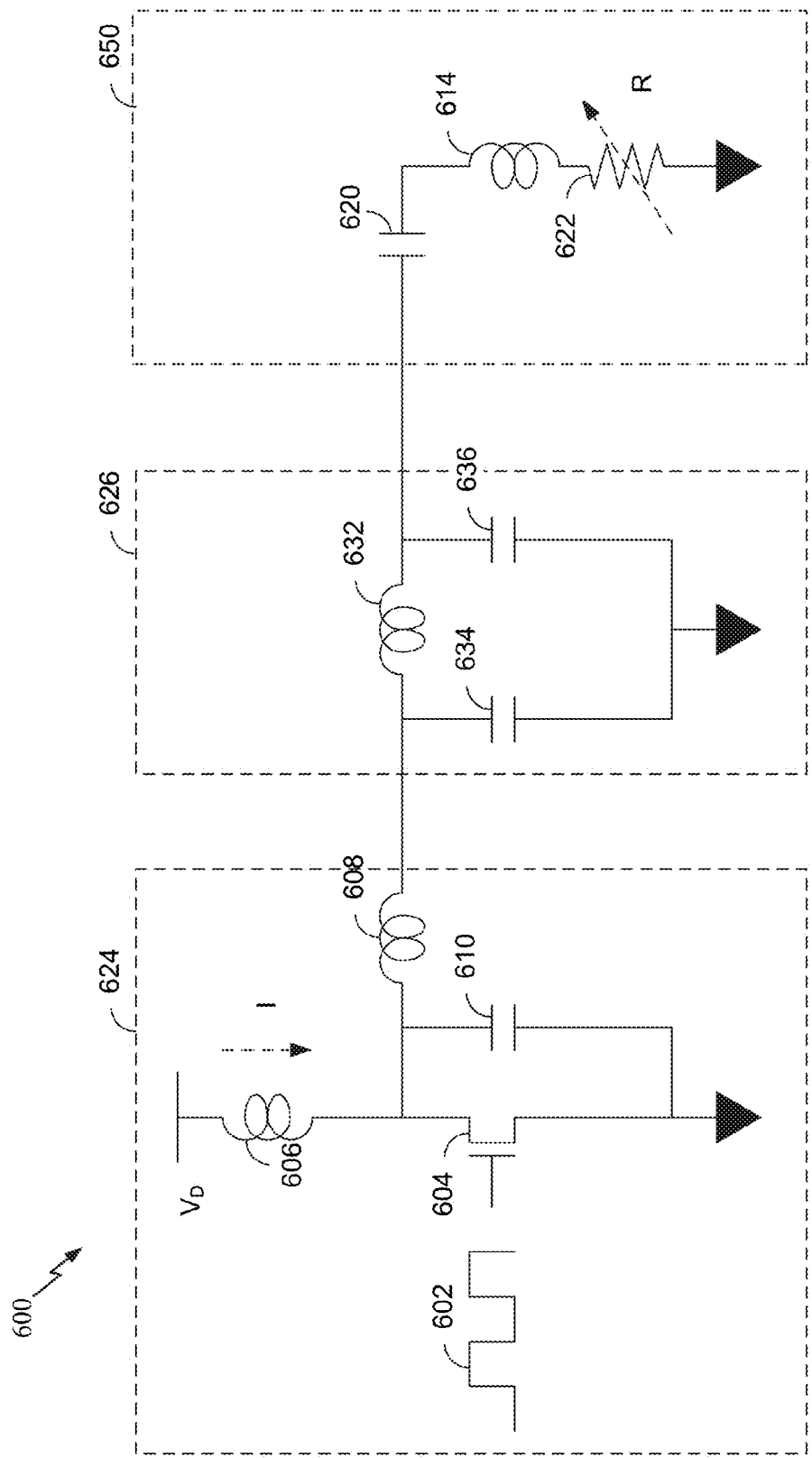
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7:
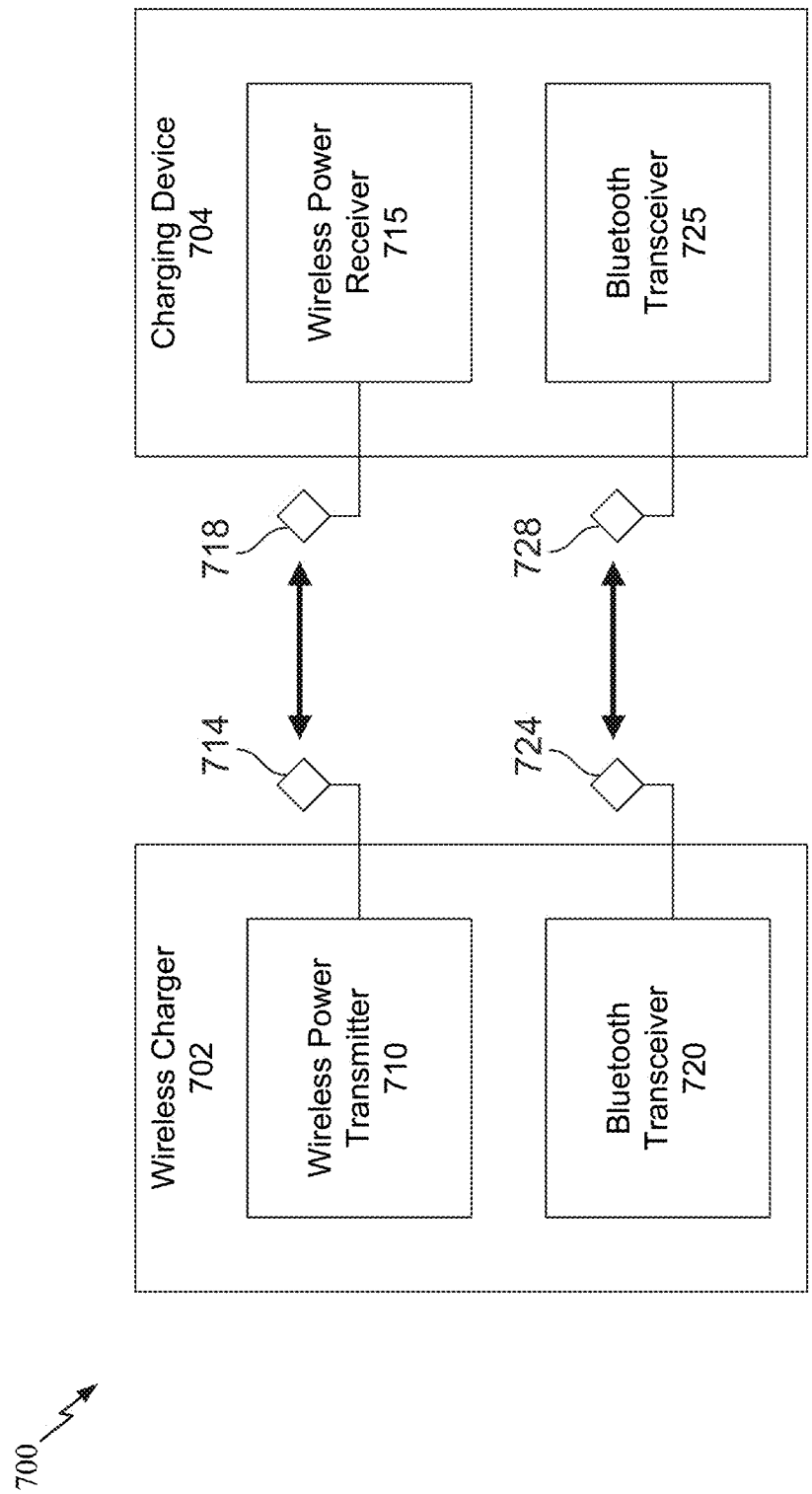
FIG. 7 is a block diagram of a wireless charging system that may incorporate the transmit circuitry of FIG. 4 and the receive circuitry of FIG. 5.

FIG. 7 is a block diagram of a wireless charging system 700 that may incorporate the transmit circuitry 406 of FIG. 4 and the receive circuitry 510 of FIG. 5. The wireless charging system 700 may comprise a wireless charger 702 and a charging device 704. The wireless charger 702 may include a wireless power transmitter 710 and a Bluetooth transceiver 720. In an embodiment, the wireless power transmitter 710 may be similar to and/or include the same functionality as the transmit circuitry 406 of FIG. 4. The charging device 704 may be similar to the charging device 550 of FIG. 5 and further include a wireless power receiver 715 and a Bluetooth transceiver 725. In an embodiment, the wireless power receiver 715 may be similar to and/or include the same functionality as the receive circuitry 510 of FIG. 5.

The wireless power transmitter 710 may be coupled to a transmit coil 714. The transmit coil 714 may be similar to the transmit coil 414 of FIG. 4. Likewise, the wireless power receiver 715 may be coupled to a receive coil 718. The receive coil 718 may be similar to the receive coil 518 of FIG. 5. In an embodiment, the wireless power transmitter 710 may be configured to transmit power wirelessly to the wireless power receiver 715 to charge the charging device 704.

The Bluetooth transceiver 720 may be coupled to Bluetooth antenna 724 and the Bluetooth transceiver 725 may be coupled to Bluetooth antenna 728. In an embodiment, the Bluetooth transceivers 720 and 725, via antennas 724 and 728, may be used to establish a connection between the wireless charger 702 and the charging device 704 such that the charging device 704 can receive power wirelessly from the wireless charger 702 in order to charge its battery or similar device. Note that while the use of the Bluetooth protocol to establish a connection between the wireless charger 702 and the charging device 704 is described herein, this is not meant to be limiting. Aspects of the disclosure as described herein may be implemented through the use of any wired or wireless communication protocol (e.g., a proprietary communication protocol, a communication protocol established by a standards organization like IEEE, etc.). For example, IrDA, Wireless USB, Z-Wave, ZigBee, USB, FireWire, and/or the like may be used.

Figure 8A:
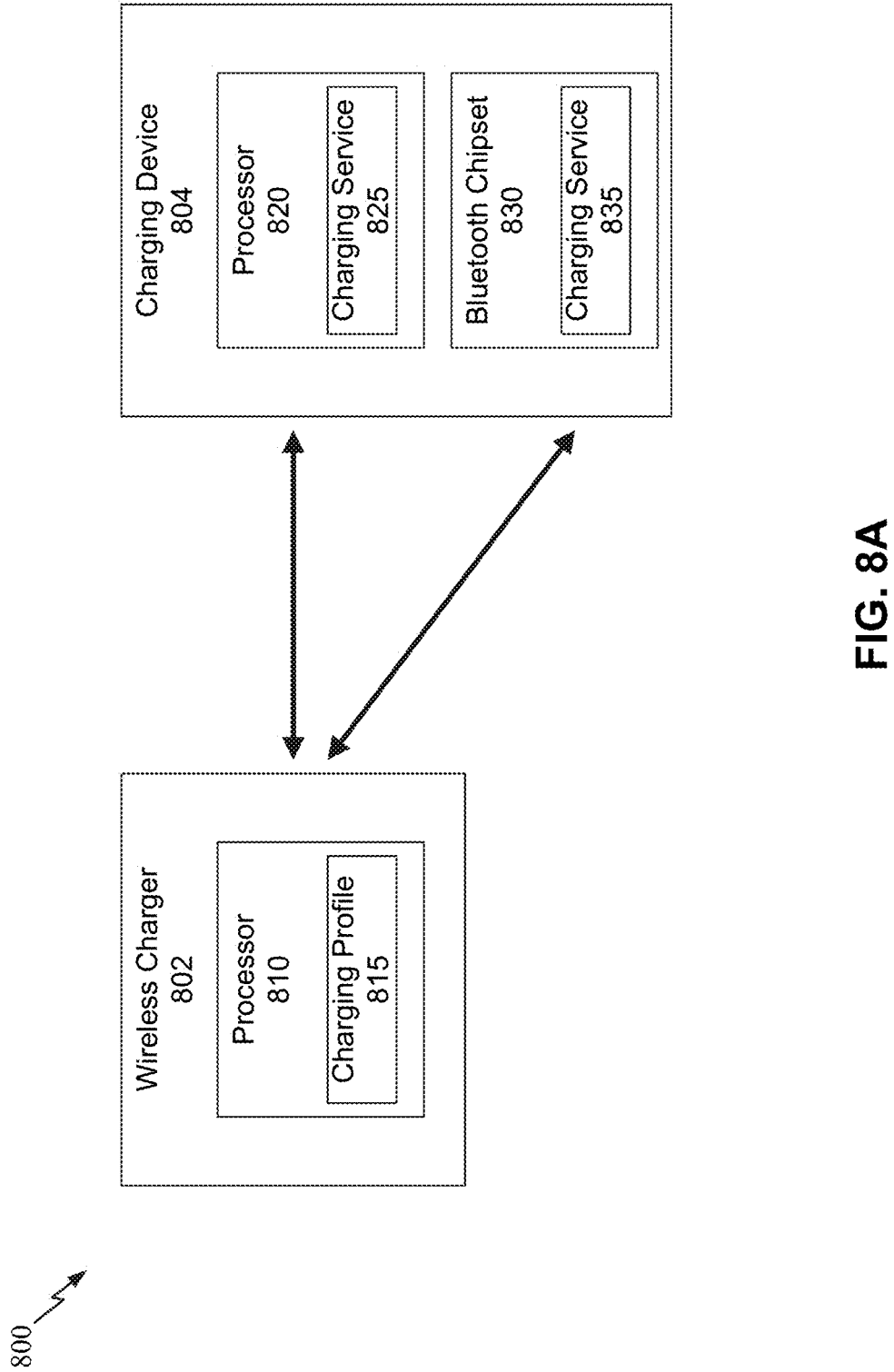
FIG. 8A is a block diagram of a charging service and profile for a wireless charging system, such as the wireless charging system of FIG. 7.

FIG. 8A is a block diagram of a charging service and profile 800 for a wireless charging system, such as the wireless charging system 700 of FIG. 7. In an embodiment, the charging service and profile 800 comprises a wireless charger 802 and a charging device 804. The wireless charger 802 may be similar to the wireless charger 702 of FIG. 7 and the charging device 804 may be similar to the charging device 704 of FIG. 7. The wireless charger 802 may include a processor 810 that is configured to operate a charging profile 815. In some aspects, the charging profile 815 is a generic attribute profile (GATT) client using the Bluetooth Low Energy (BLE) transport, where the GATT establishes common operations and a framework for the data transported and stored by an attribute protocol. In general, the GATT is used for discovery services.

The charging device 804 may operate in two modes: a self-powered mode and a charger powered mode. In a self-powered mode, the charging device 804 contains enough power (e.g., enough charge remaining in its battery or other internal power source) to operate in a normal mode while charging. In a charger powered mode, the charging device 804 does not have enough power to operate in the normal mode and requires power from the wireless charger 802 to power up to support a charging operation.

The charging device 804 may include a processor 820 that is configured to operate a charging service 825. In some aspects, the charging service 825 is a GATT server using the BLE transport, where a GATT server stores the data transported over the attribute protocol and access attribute protocol requests, commands, and confirmations from the GATT client. In an embodiment, the charging service 825 may interact with the charging profile 815 when the charging device 804 is operating in a self-powered mode. For example, the charging device 804 in a self-powered mode may have enough charge remaining in its battery such that a device like the processor 820, which may use more power than other components like a chipset, can be powered up. In other embodiments, the charging service 825 may interact with the charging profile 815 when the charging device 804 is operating in a charger powered mode.

The charging device 804 may also include a chipset, such as a Bluetooth chipset 830, that is configured to operate a charging service 835. In some aspects, the charging service 835 is a GATT server. In an embodiment, the charging service 835 may interact with the charging profile 815 when the charging device 804 is operating in a charger powered mode. For example, the charging device 804 in a charger powered mode may not have enough charge to power up all of its components, like the processor 820. As a way to conserve power, using the power received from the wireless charger 802, only the Bluetooth chipset 830 may be powered up. In other embodiments, the charging service 835 may interact with the charging profile 815 when the charging device 804 is operating in a self-powered mode. In other words, the charging device 804 may include at least two GATT servers, each implementing a different charging service 825 or 835, and each server may include one instance of a WiPower charging service (WPCS) and one instance of a device information service (DIS).

While FIG. 8A depicts the chipset 830 as being a Bluetooth chipset, it should be noted that this is not meant to be limiting and the chipset 830 may be designed to handle any wireless communications protocol. In still further embodiments, the charging service 825 and/or 835 may be embodied in an accessory to the charging device 804, such as an external device or a skin.

Figure 8B:
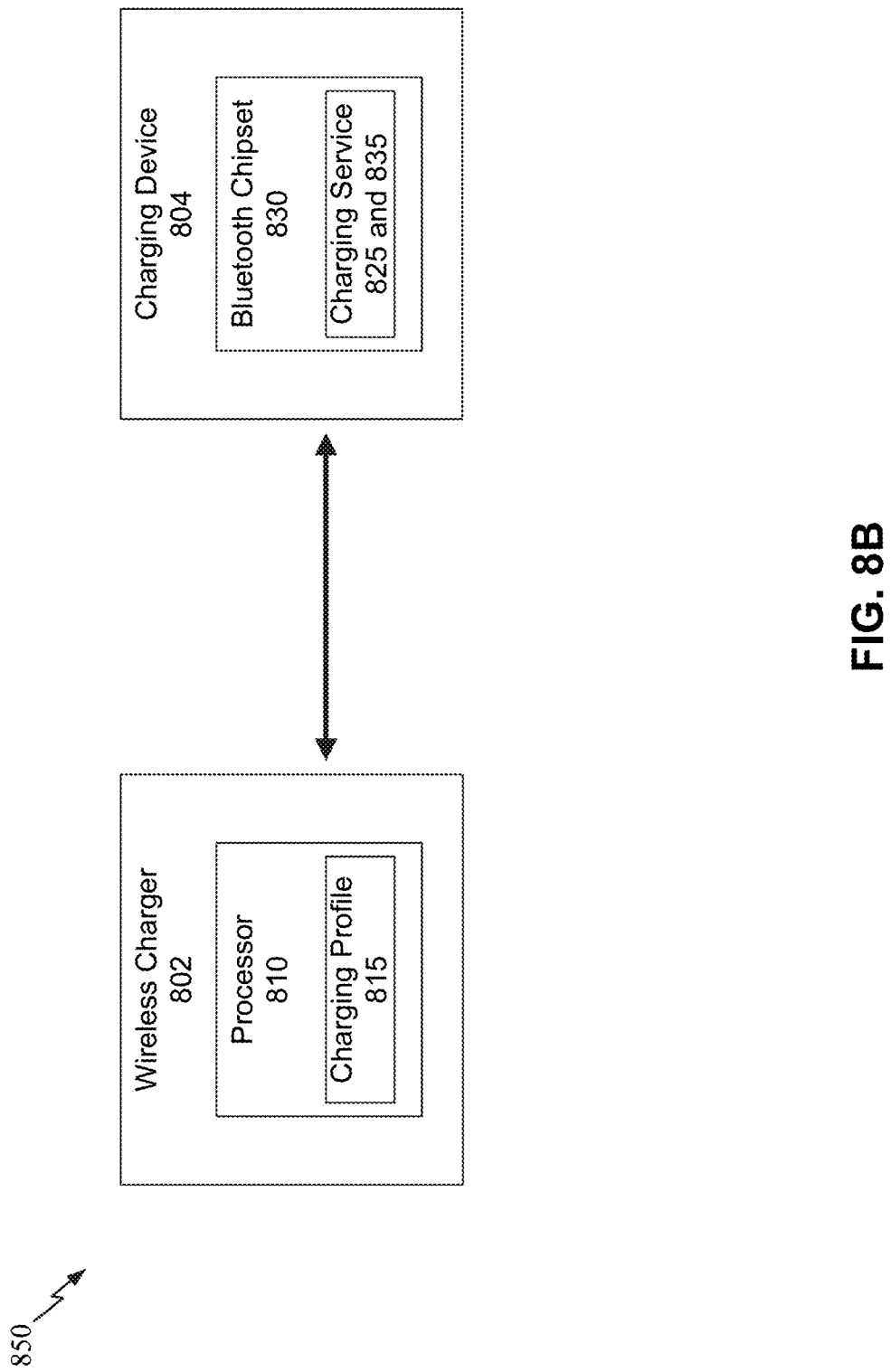
FIG. 8B is another block diagram of a charging service and profile for a wireless charging system, such as the wireless charging system of FIG. 7.

FIG. 8B is another block diagram of a charging service and profile 850 for a wireless charging system, such as the wireless charging system 700 of FIG. 7. In an embodiment, the charging device 804 may include a chipset, such as a Bluetooth chipset 830, that is configured to operate the charging services 825 and 835. The charging service 825 may be used to interact with the charging profile 815 when the charging device 804 is in a self-powered mode and the charging service 835 may be used to interact with the charging profile 815 when the charging device 804 is in a charger powered mode. Alternatively, the charging service 825 may be used to interact with the charging profile 815 when the charging device 804 is in a charger powered mode and the charging service 835 may be used to interact with the charging profile 815 when the charging device 804 is in a self-powered mode. In other embodiments, a processor, such as the processor 820 of FIG. 8A, may be configured to operate the charging services 825 and 835. In other words, the charging device 804 may include one GATT server that implements at least two different charging services 825 or 835, and the GATT server may include one instance of a WPCS and one instance of a DIS.

Figure 9:
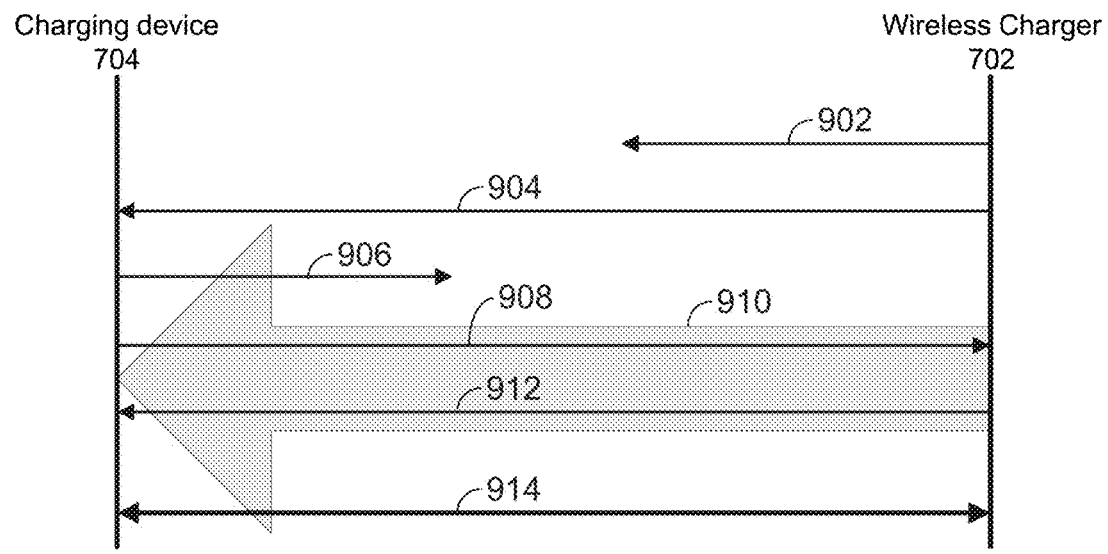
FIG. 9 is a timing diagram of communications between a wireless charger and a charging device, such as the wireless charger and the charging device of FIG. 7, to establish a connection between the wireless charger and the charging device.

FIG. 9 is a timing diagram of communications between a wireless charger and a charging device, such as the wireless charger 702 and the charging device 704, to establish a connection between the wireless charger and the charging device. The wireless charger 702 may transmit a power pulse 902, where the power pulse 902 can be used to supply power to a charging device, like charging device 704, to charge the charging device. The wireless charger 702 may transmit the power pulse 902 in order to detect a charging device. As illustrated in FIG. 9, the power pulse 902 was transmitted, but no charging device was in range of the power pulse 902. The wireless charger 702 may wait a period of time before transmitting another power pulse 904. For example, the wireless charger 702 may wait 11.25 ms or 22.5 ms. Upon transmitting the power pulse 902 and/or 904, the wireless charger 702 may start a general connection establishment procedure. As illustrated in FIG. 9, the power pulse 904 was transmitted and in range of the charging device 704.

In some embodiments, the wireless charger 702 begins scanning for advertising (e.g., a connection solicitation or a notice of device characteristics) from a device, like the charging device 704. In further embodiments, once the wireless charger 702 detects a load on the power pulse 904, the wireless charger 702 begins scanning for advertising (e.g., a connection solicitation or a notice of device characteristics) from a device, like the charging device 704. In this way, the wireless charger 702 may conserve power by only scanning for advertising once it detects a load on a power pulse. In an embodiment, the power pulse 904 causes the charging device 704 to generate an advertising (e.g., a processor of the charging device 704 may generate the advertising). The advertising may include a target device address and a charging service type. As an example, the advertising may be a BLE advertising 906. The charging device 704 may transmit the BLE advertising 906 (e.g., as a broadcasted message) with the wireless charger 702 as the intended recipient. If the BLE advertising 906 does not reach the wireless charger 702 (as depicted in FIG. 9), then the charging device 704 may generate and transmit another BLE advertising 908. For example, the charging device 704 may wait 20 ms before sending another BLE advertising 908. If a connection is not established within a certain time frame, such as 10 seconds, the charging device 704 may exit a connectable mode and stop any charging that may have started. In this way, the charging device 704 may conserve power by only generating and transmitting a BLE advertising 906 and/or 908 once it receives a power pulse 902 and/or 904 from the wireless charger 702.

Once the wireless charger 702 receives the BLE advertising 908, the wireless charger 702 may transmit a connection request 912 to the charging device 704. If the charging device 704 accepts the connection request 912, then a connection 914 is established between the wireless charger 702 and the charging device 704. In some embodiments, once the wireless charger 702 receives the BLE advertising 908, the wireless charger 702 may continue transmitting the power pulse 902 and/or 904 until the connection 914 is established between the wireless charger 702 and the charging device 704.

Note that during the connection process illustrated in FIG. 9, the wireless charger 702 may continue to transmit power 910, such as via the power pulse 902 and/or 904, in order to charge the charging device 704. In some aspects, the charging device 704 may be in a charger powered mode, and the power 910 would allow the charging device 704 to remain active in order to establish a connection with the wireless charger 702. Once the wireless charger 702 determines that a connection cannot be established, that the charging device 704 is now in a self-powered mode, and/or that the charging device 704 otherwise does not need the power transmitted from the wireless charger 702, then the wireless charger 702 may stop transmitting the power 910.

If a connection is lost at any point, the charging device 704 may attempt to reconnect with the wireless charger 702. Alternatively, the charging device 704 may wait until it receives another power pulse 902 and/or 904 from the wireless charger 702.

Figure 10:
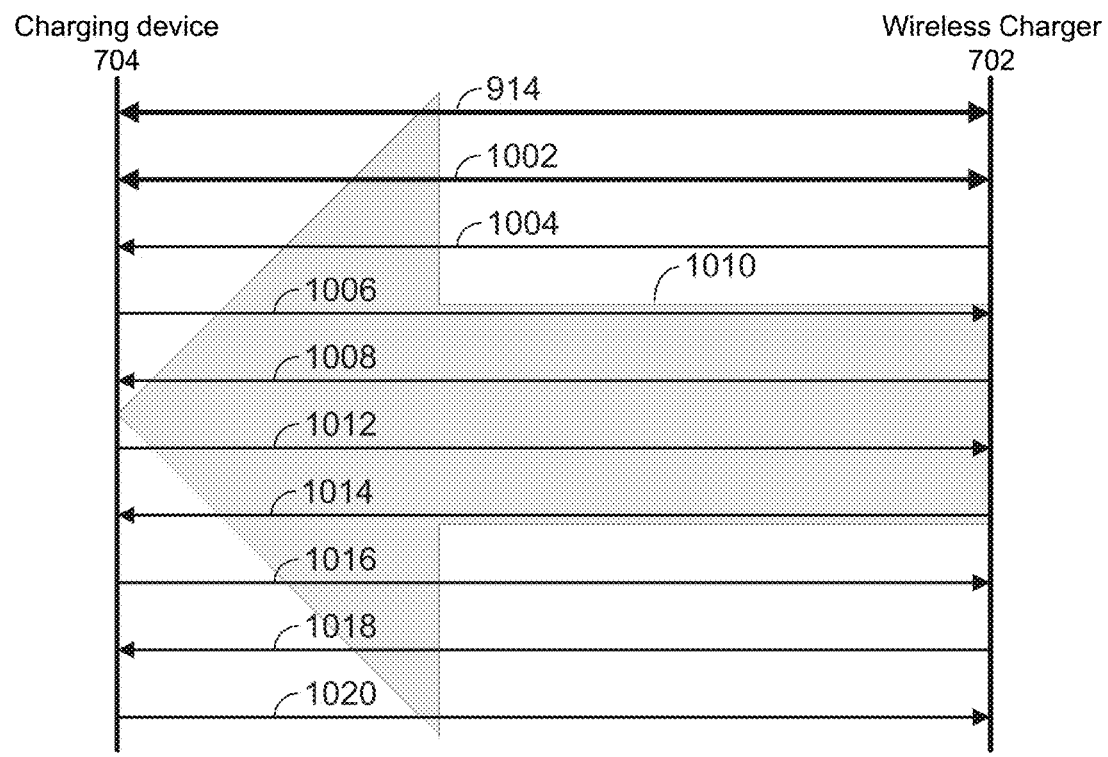
FIG. 10 is a timing diagram of communications between a wireless charger and a charging device, such as the wireless charger and the charging device of FIG. 7, during a first connection.

FIG. 10 is a timing diagram of communications between a wireless charger and a charging device, such as the wireless charger 702 and the charging device 704 of FIG. 7, during a first connection. In an embodiment, the following communications may occur during a first connection regardless of whether the charging device is operating in a self-powered mode or a charger powered mode. After a connection 914 is established between the wireless charger 702 and the charging device 704, the wireless charger 702 may authenticate the charging device 704 to ensure the charging device 704 is compatible with the charger via a BLE authenticate/encrypt/bond procedure 1002. The BLE authenticate/encrypt/bond procedure 1002 is described in more detail with respect to FIGS. 11 and 12.

After authentication, the wireless charger 702 may discover a primary service by transmitting a universally unique identifier (UUID) request 1004. For example, the UUID request 1004 may be used to discovery a primary WPCS. The charging device 704 may respond with a UUID response 1006. The wireless charger 702 may then discover some or all characteristics of a service by transmitting a service request 1008. For example, the service request 1008 may be used to discover some or all characteristics of a WPCS. The charging device 704 may respond with a service response 1012.

The wireless charger 702 may then discovery a primary service by transmitting a UUID request 1014. For example, the UUID request 1014 may be used to discovery a primary DIS. The charging device 704 may respond with a UUID response 1016. The wireless charger 702 may then discover some or all characteristics of a service by transmitting a service request 1018. For example, the service request 1018 may be used to discover some or all characteristics of a DIS. The charging device 704 may respond with a service response 1020.

Note that during the first connection process illustrated in FIG. 10, the wireless charger 702 may continue to transmit power 1010 in order to charge the charging device 704. In some aspects, the charging device 704 may be in a charger-powered mode, and the power 1010 would allow the charging device 704 to remain active in order to establish a connection with the wireless charger 702. Once the wireless charger 702 determines that a connection has been terminated and/or that the charging device 704 otherwise does not need the power transmitted from the wireless charger 702, then the wireless charger 702 may stop transmitting the power 1010.

Figure 11:
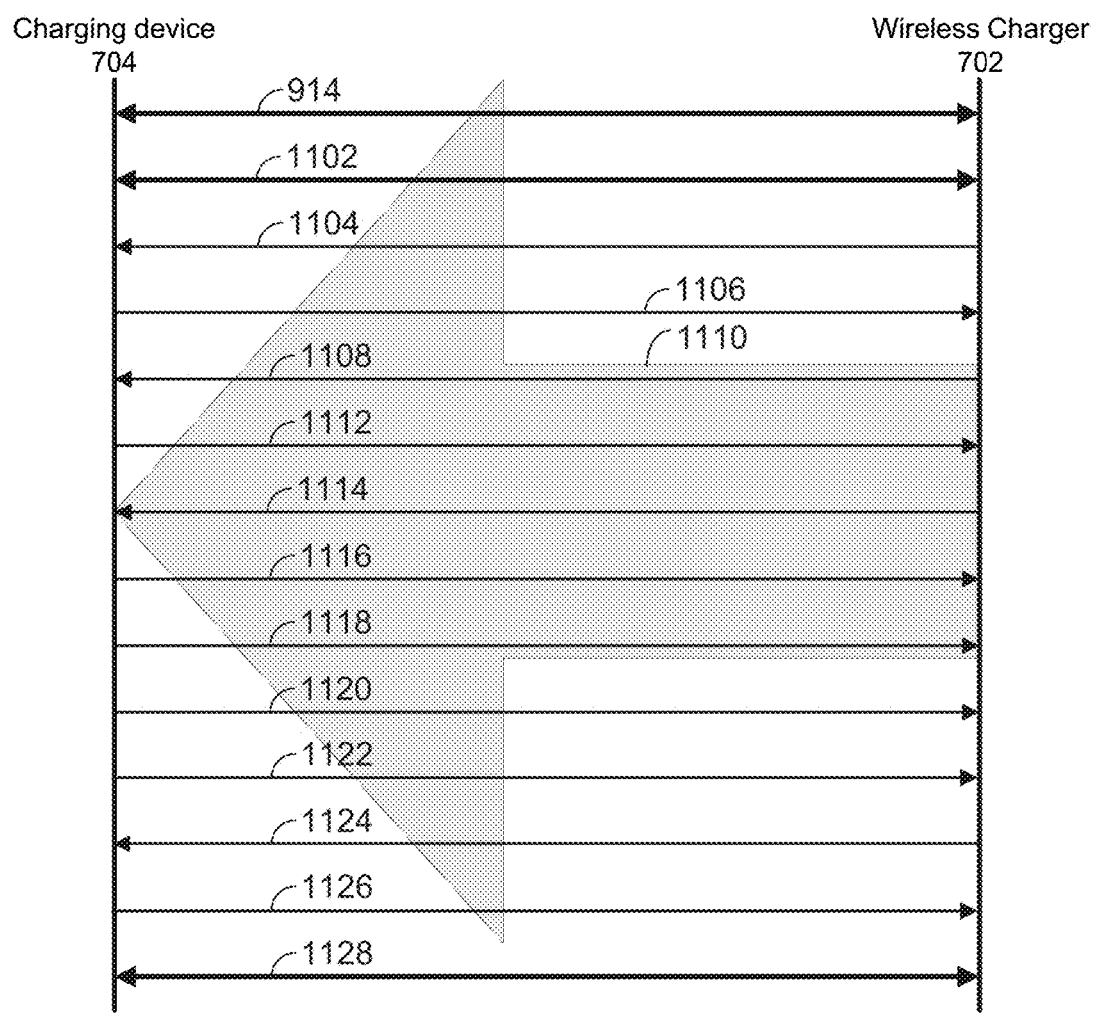
FIG. 11 is a timing diagram of communications between a wireless charger and a charging device, such as the wireless charger and the charging device of FIG. 7.

FIG. 11 is a timing diagram of communications between a wireless charger and a charging device, such as the wireless charger 702 and the charging device 704 of FIG. 7. In an embodiment, the following communications may occur when the charging device 704 is operating in a self-powered mode. After a connection 914 is established between the wireless charger 702 and the charging device 704, the wireless charger 702 may authenticate the charging device 704 to ensure the charging device 704 is compatible with the charger using a challenge response protocol over the BLE transport (e.g., via a BLE authenticate/encrypt procedure 1102).

The wireless charger 702 may transmit a write without response (WPT authenticate) value 1104 to the charging device 704. In an embodiment, based on the received value, the charging device 704 may generate a key value and transmit the key value to the wireless charger 702 via notification (WPT authenticate) value response 1106. In other embodiments, based on the received value, the charging device 704 may transmit a key value stored or embedded in the charging device 704 to the wireless charger 702 via a notification (WPT authenticate) value response 1106. The key value may be a public key, a private key, a public key certificate, a digital signature, a security token, a unique manufacturer identifier, or the like. If the key value matches the value expected by the wireless charger 702, then the authentication is complete and the wireless charger 702 has determined that the charging device 704 is compatible with it.

In other aspects, the wireless charger 702 may engage in one or more communications with the charging device 704 to ensure that the charging device 704 is compatible with the charger 702. The wireless charger 702 may transmit one or more authentication messages to the charging device 704. If the one or more responses received from the charging device 704 match the responses expected by the wireless charger 702, then the authentication is complete and the wireless charger 702 has determined that the charging device 704 is compatible with it. For example, the wireless charger 702 may use a combination key to authenticate the charging device 704. The wireless charger 702 may transmit a request for a charger technology key value stored in the charging device 704. The charger technology key value stored in the charging device 704 and transmitted by the charging device 704 to the wireless charger 702 may match a value expected by the wireless charger 702 if the charging device 704 is compatible with the wireless charger 702. If the charging device 704 is compatible, the wireless charger 702 may then transmit a request for a manufacturer key value stored in the charging device 704. The manufacturer key value stored in the charging device 704 and transmitted by the charging device 704 to the wireless charger 702 may match a value expected by the wireless charger 702 if the charging device 704 is manufactured by the manufacturer of the charging device 704. In other embodiments, the wireless charger 702 may request both the charger technology key value and the manufacturer key value at a same or nearly same time. In this way, a manufacturer may be able to restrict the wireless charger 702 to only charge charging devices 704 manufactured by the manufacturer and/or to charge charging devices 704 manufactured by the manufacturer differently than other compatible charging devices 704.

In still other aspects, the wireless charger 702 may authenticate the charging device via one-way communications. The wireless charger 702 may transmit one or more messages and determine whether the charging device 704 is compatible based on the behavior or actions of the charging device 704. For example, the charging device 704 may be compatible and authentication may be complete if the charging device 704 temporarily stops receiving power from the wireless charger 702 based on one or more messages transmitted by the wireless charger 702. Likewise, the charging device 704 may transmit one or more messages without being prompted and the wireless charger 702 may determine whether the charging device 704 is compatible based on the received one or more messages. For example, compatible devices 704 may be configured to transmit a specific message or set of messages within a time period of first receiving a power pulse. If the wireless charger 702 receives the specific message or set of messages within the time period, then the wireless charger 702 may determine that the charging device 704 is compatible and authentication may be complete.

In an embodiment, if the authentication fails, the wireless charger 702 may reduce an amount of power transmitted or stop transmitting power to the charging device 704. In other embodiments, the wireless charger 702 may transmit power to the charging device 704 at a low level before authentication takes place. If authentication succeeds, then the wireless charger 702 may transmit power to the charging device 704 at a normal level. If authentication fails, then the wireless charger 702 may continue transmitting power to the charging device 704 at the low level or may stop transmitting power to the charging device 704.

The wireless charger 702 may then transmit a read characteristic value 1108 to the charging device 704. In an embodiment, the read characteristic value 1108 may include charging parameters. The charging device 704 may respond by transmitting a read response 1112. In an embodiment, the read response 1112 may include charging parameters.

The wireless charger 702 may then transmit a write characteristic value 1114 to the charging device 704. In an embodiment, the write characteristic value 1114 may include a charging control to instruct the charging device 704 to transition into a charge state to start charging. The charging device 704 may respond with a write characteristic value response 1116. In an embodiment, the write characteristic value response 1116 may include a confirmation that the charging device 704 will transition into the charge state and start charging.

During the charging, the charging device 704 may periodically transmit a notification value 1118, 1120, and/or 1122 to the wireless charger 702. In an embodiment, the notification values 1118, 1120, and/or 1122 may include a charging report indicating a current charge level and/or voltage level of the charging device 704. Once the wireless charger 702 determines that the charging device 704 has a sufficient amount of power, the wireless charger 702 may transmit a write characteristic value 1124. In an embodiment, the write characteristic value 1124 may include a charging control to instruct the charging device 704 to stop charging. The charging device 704 may respond with a write characteristic value response 1126. In an embodiment, the write characteristic value response 1126 may include a confirmation that the charging device 704 will stop charging. Once the wireless charger 702 receives the write characteristic value response 1126, the connection is terminated 1128.

Note that during the communications illustrated in FIG. 11, the wireless charger 702 may continue to transmit power 1110 in order to charge the charging device 704. Once the wireless charger 702 determines that a connection has been terminated 1128 and/or that the charging device 704 otherwise does not need the power transmitted from the wireless charger 702, then the wireless charger 702 may stop transmitting the power 1110.

Figure 12:
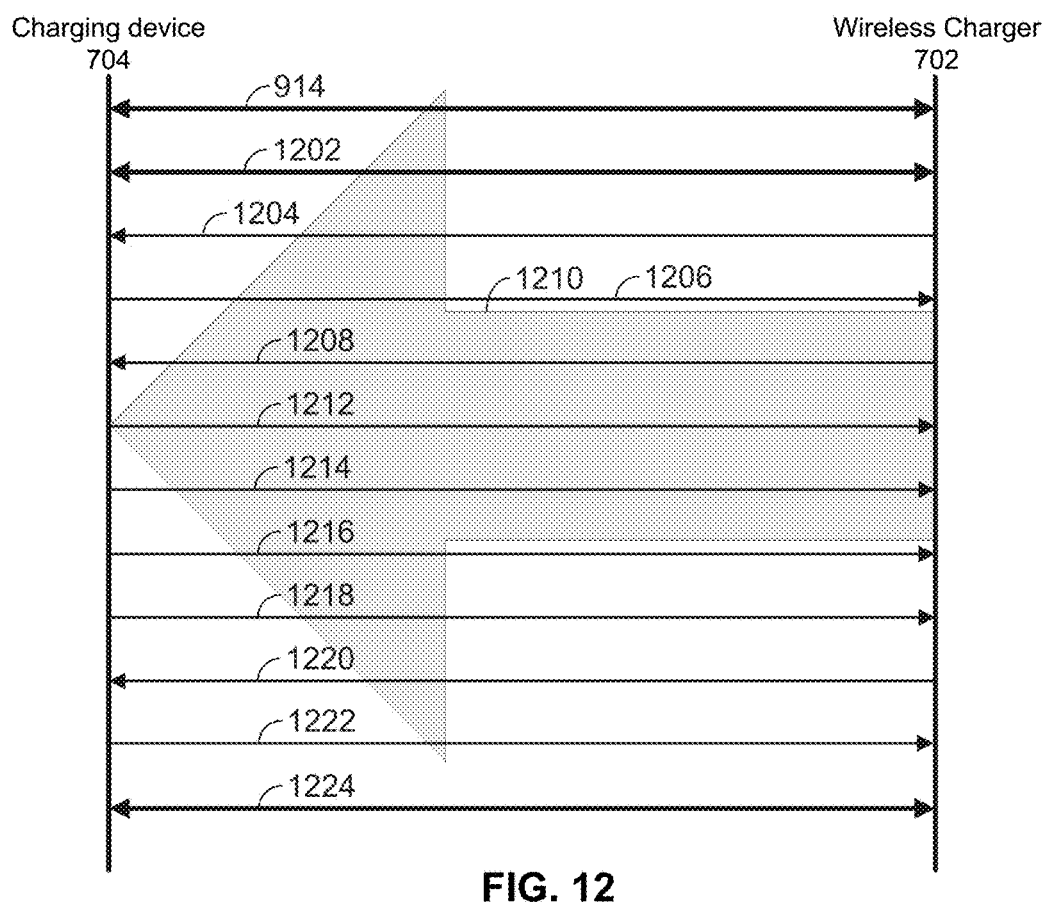
FIG. 12 is another timing diagram of communications between a wireless charger and a charging device, such as the wireless charger and the charging device of FIG. 7.

FIG. 12 is another timing diagram of communications between a wireless charger and a charging device, such as the wireless charger 702 and the charging device 704 of FIG. 7. In an embodiment, the following communications may occur when the charging device 704 is operating in a charger powered mode. After a connection 914 is established between the wireless charger 702 and the charging device 704, the wireless charger 702 may authenticate the charging device 704 to ensure the charging device 704 is compatible with the charger via a BLE authenticate/encrypt procedure 1202.

The wireless charger 702 may transmit a write without response (WPT authenticate) value 1204 to the charging device 704. The based on the received value, the charging device 704 may generate a key value and transmit the key value to the wireless charger 702 via notification (WPT authenticate) value response 1206. If the key value matches the value expected by the wireless charger 702, then the authentication is complete and the wireless charger 702 has determined that the charging device 704 is compatible with it. If the authentication fails, the wireless charger 702 may stop transmitting power 1210 to the charging device 704.

The wireless charger 702 may then transmit a read characteristic value 1208 to the charging device 704. In an embodiment, the read characteristic value 1208 may include charging parameters. The charging device 704 may respond by transmitting a read response 1212. In an embodiment, the read response 1212 may include charging parameters.

Note that unlike the communications as depicted in FIG. 11, the wireless charger 702 may not need to transmit a write characteristic value 1114 to the charging device 704 to instruct the charging device 704 to start charging. In an embodiment, since the charging device 704 is operating in a charger powered mode, it may be assumed that the charging device 704 is already in a charging state.

During the charging, the charging device 704 may periodically transmit a notification value 1214, 1216, and/or 1218 to the wireless charger 702. In an embodiment, the notification values 1214, 1216, and/or 1218 may include a charging report indicating a current charge level and/or voltage level of the charging device 704. Once the wireless charger 702 determines that the charging device 704 has a sufficient amount of power, the wireless charger 702 may transmit a write characteristic value 1220. In an embodiment, the write characteristic value 1220 may include a charging control to instruct the charging device 704 to stop charging. The charging device 704 may respond with a write characteristic value response 1222. In an embodiment, the write characteristic value response 1222 may include a confirmation that the charging device 704 will stop charging. Once the wireless charger 702 receives the write characteristic value response 1222, the connection is terminated 1224.

Note that during the communications illustrated in FIG. 12, the wireless charger 702 may continue to transmit power 1210 in order to charge the charging device 704. In some aspects, the charging device 704 may be in a charger powered mode, and the power 1210 would allow the charging device 704 to remain active in order to establish a connection with the wireless charger 702. Once the wireless charger 702 determines that a connection has been terminated and/or that the charging device 704 otherwise does not need the power transmitted from the wireless charger 702, then the wireless charger 702 may stop transmitting the power 1210.

Figure 13:
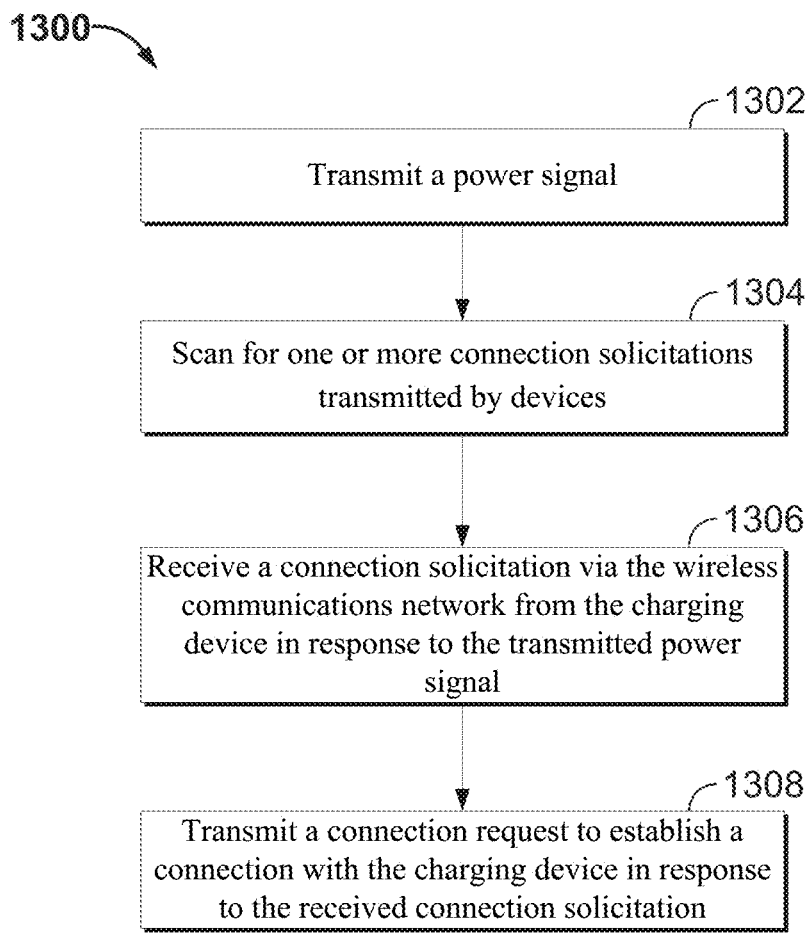
FIG. 13 is a flowchart of an exemplary method for connecting with a charging device wirelessly via a wireless communications network.

FIG. 13 is a flowchart of an exemplary method 1300 for connecting with a charging device via a wireless communications network (e.g., a personal area network that uses a Bluetooth interface). In an embodiment, the steps in flowchart 1300 may be performed by wireless charger 702. Although the method of flowchart 1300 is described herein with reference to a particular order, in various embodiments, blocks herein may be performed in a different order, or omitted, and additional blocks may be added. A person having ordinary skill in the art will appreciate that the method of flowchart 1300 may be implemented in device that may be configured to charge another device via the wireless transfer of power.

At block 1302, the method 1300 transmits a power signal. In an embodiment, the power signal is a power pulse. At block 1304, the method 1300 scans for one or more connection solicitations transmitted by devices. In an embodiment, the method 1300 may detect a load based on the transmitted power signal. The method 1300 may then scan for one or more connection solicitations transmitted by devices based on the detected load. At block 1306, the method 1300 receives a connection solicitation via the wireless communications network from the charging device in response to the transmitted power signal. At block 1308, the method 1300 transmits a connection request to establish a connection with the charging device in response to the received connection solicitation. In some embodiments, when the method 1300 receives a connection solicitation from the charging device, the method 1300 continues to transmit the power signal until a connection is established.

Figure 14:
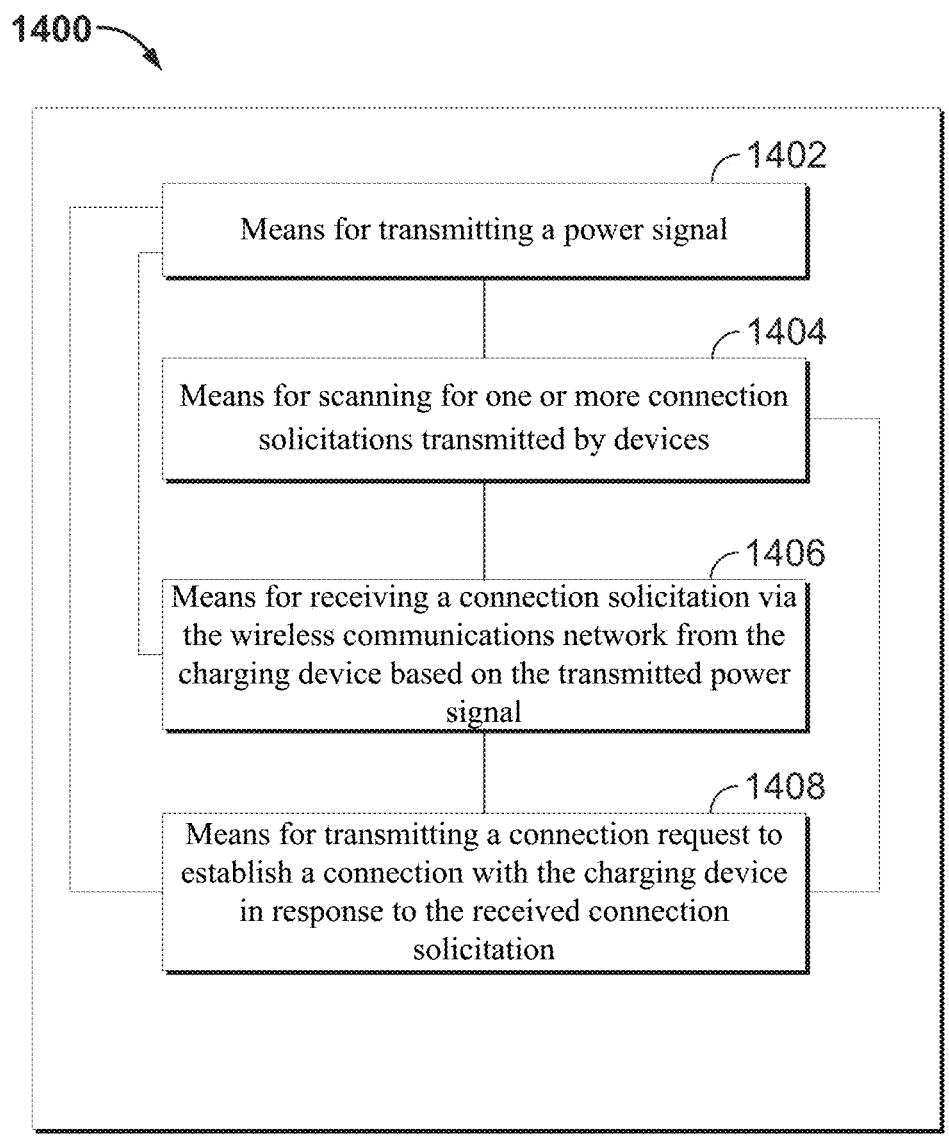
FIG. 14 is a functional block diagram of a wireless charger, in accordance with an exemplary embodiment.

FIG. 14 is a functional block diagram of a wireless charger 1400, in accordance with an exemplary embodiment. Wireless charger 1400 comprises means 1402, means 1404, means 1406, and means 1408 for the various actions discussed with respect to FIGS. 1-12. The wireless charger 1400 includes means 1402 for transmitting a power signal. In an embodiment, means 1402 for transmitting a power signal may be configured to perform one or more of the functions discussed above with respect to block 1302. The wireless charger 1400 further includes means 1404 for scanning for one or more connection solicitations transmitted by devices. In an embodiment, means 1404 for scanning for one or more connection solicitations transmitted by devices may be configured to perform one or more of the functions discussed above with respect to block 1304. The wireless charger 1400 further includes means 1406 for receiving a connection solicitation via the wireless communications network from the charging device in response to the transmitted power signal. In an embodiment, means 1406 for receiving a connection solicitation via the wireless communications network from the charging device in response to the transmitted power signal may be configured to perform one or more of the functions discussed above with respect to block 1306. The wireless charger 1400 further includes means 1408 for transmitting a connection request to establish a connection with the charging device in response to the received connection solicitation. In an embodiment, means 1408 for transmitting a connection request to establish a connection with the charging device in response to the received connection solicitation may be configured to perform one or more of the functions discussed above with respect to block 1308.

Figure 15:
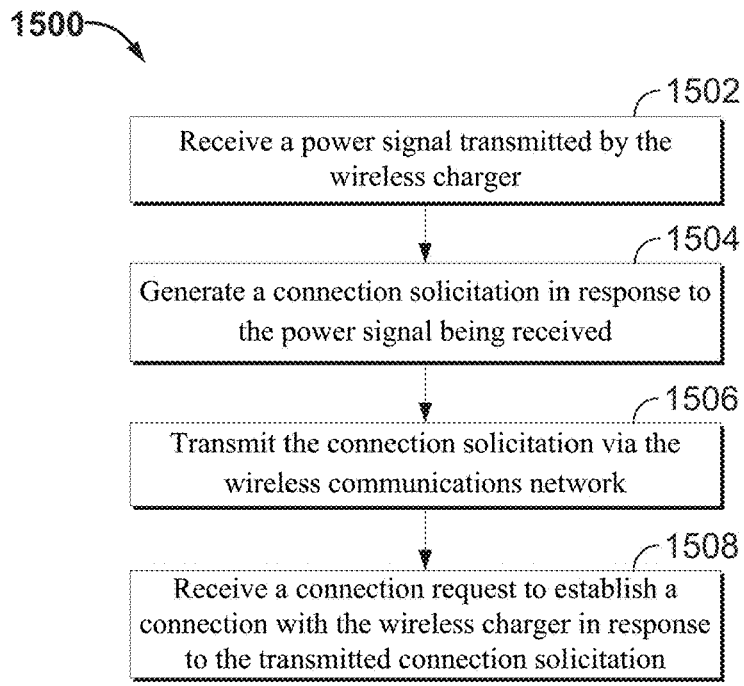
FIG. 15 is a flowchart of an exemplary method for connecting with a wireless charger via a wireless communications network.

FIG. 15 is a flowchart of an exemplary method 1500 for connecting with a wireless charger wirelessly via a wireless communications network (e.g., a personal area network that uses a Bluetooth interface). In an embodiment, the steps in flowchart 1500 may be performed by charging device 704. Although the method of flowchart 1500 is described herein with reference to a particular order, in various embodiments, blocks herein may be performed in a different order, or omitted, and additional blocks may be added. A person having ordinary skill in the art will appreciate that the method of flowchart 1500 may be implemented in device that may be configured to be charged by another device via the wireless transfer of power.

At block 1502, the method 1500 receives a power signal transmitted by the wireless charger. At block 1504, the method 1500 generates a connection solicitation in response to the power signal being received. At block 1506, the method 1500 transmits the connection solicitation via the wireless communications network. At block 1508, the method 1500 receives a connection request to establish a connection with the wireless charger in response to the transmitted connection solicitation.

Figure 16:
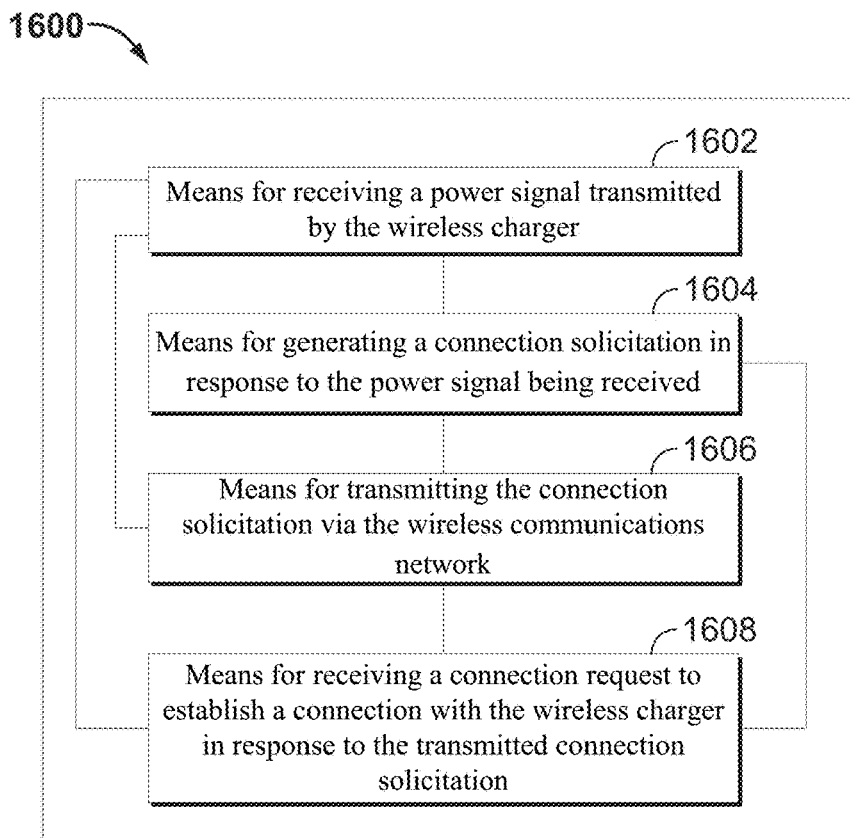
FIG. 16 is a functional block diagram of a charging device, in accordance with an exemplary embodiment.

FIG. 16 is a functional block diagram of a charging device 1600, in accordance with an exemplary embodiment. Charging device 1600 comprises means 1602, means 1604, means 1606, and means 1608 for the various actions discussed with respect to FIGS. 1-12. The charging device 1600 includes means 1602 for receiving a power signal transmitted by the wireless charger. In an embodiment, means 1602 for receiving a power signal transmitted by the wireless charger may be configured to perform one or more of the functions discussed above with respect to block 1502. The charging device 1600 further includes means 1604 for generating a connection solicitation in response to the power signal being received. In an embodiment, means 1604 for generating a connection solicitation in response to the power signal is received may be configured to perform one or more of the functions discussed above with respect to block 1504. The charging device 1600 further includes means 1606 for transmitting the connection solicitation via the wireless communications network. In an embodiment, means 1606 for transmitting the connection solicitation via the wireless communications network may be configured to perform one or more of the functions discussed above with respect to block 1506. The charging device 1600 further includes means 1608 for receiving a connection request to establish a connection with the wireless charger in response to the transmitted connection solicitation. In an embodiment, means 1608 for receiving a connection request to establish a connection with the wireless charger in response to the transmitted connection solicitation may be configured to perform one or more of the functions discussed above with respect to block 1508.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. The means for transmitting a power signal and the means for transmitting a connection request comprise a transmitter. The means for detecting a load comprises a load detector. The means for scanning for one or more connection solicitations transmitted by devices comprises a device scanner. The means for receiving a connection solicitation comprises a receiver. The means for receiving a power signal and the means for receiving a connection request comprise a receiver. The means for generating a connection solicitation comprises a processor. The means for transmitting the connection solicitation comprises a transmitter.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A charging device for connecting with a wireless charger via a wireless communications network, the charging device comprising:
    a receiver configured to receive a power signal transmitted by the wireless charger, wherein receipt of the power signal causes the receiver to be detectable by the wireless charger;
    a processor configured to generate a connection solicitation in response to the power signal being received; and
    a transmitter configured to transmit the connection solicitation via the wireless communications network, the receiver further configured to receive a connection request to establish a connection with the wireless charger in response to the transmitted connection solicitation.

2. The charging device of claim 1, wherein the connection solicitation is broadcasted by the transmitter.

3. The charging device of claim 1, wherein the power signal charges the charging device.

4. The charging device of claim 3, wherein the processor is further configured to operate in one of a charger powered mode, in which the charging device does not include enough power to operate in a normal mode while charging, or a self-powered mode, in which the charging device includes enough power to operate in the normal mode while charging.

5. The charging device of claim 4, wherein the charger powered mode is supported by a first physical implementation and the self-powered mode is supported by a second physical implementation, wherein the processor is configured to operate in the charger powered mode, and wherein the transmitter is further configured to transmit a command to terminate the connection with the wireless charger when the charging device receives a sufficient amount of power such that the processor can operate in the normal mode while the charging device is charging.

6. The charging device of claim 5, wherein the processor is further configured to transition into the self-powered mode when the charging device receives a sufficient amount of power such that the processor can operate in the normal mode while the charging device is charging, and wherein the transmitter is further configured to transmit a message to reestablish a connection with the wireless charger.

7. The charging device of claim 4, wherein the charger powered mode is supported by a first physical implementation and the self-powered mode is supported by a second physical implementation.

8. The charging device of claim 7, wherein the processor is further configured to transition from the charger powered mode to the self-powered mode when the charging device receives a sufficient amount of power such that the processor can operate in the normal mode while the charging device is charging without terminating the connection with the wireless charger.

9. The charging device of claim 4, wherein the receiver is further configured to receive a command to initiate a charging operation in the charging device when the processor is operating in the self-powered mode.

10. The charging device of claim 1, wherein the transmitter is further configured to transmit a charging report to the wireless charger, the charging report comprising a current charging level of the charging device.

11. The charging device of claim 10, wherein the receiver is further configured to receive a stop charging command from the wireless charger based on the transmitted charging report.

12. The charging device of claim 1, wherein the wireless communications network uses a predetermined protocol for communication.

13. The charging device of claim 1, wherein the connection solicitation comprises charging information associated with a charging service.

14. The charging device of claim 13, wherein the charging information comprises a target device address and a charging service type.

15. The charging device of claim 1, wherein the connection request is received in a communication separate from the received power signal.

16. A method for connecting with a wireless charger via a wireless communications network, the method comprising:
    receiving by a load a power signal transmitted by the wireless charger, wherein receipt of the power signal causes the wireless charger to detect the load;
    generating a connection solicitation by a processor in response to the power signal being received by the load;
    transmitting the connection solicitation by a transmitter via the wireless communications network; and
    receiving a connection request to establish a connection with the wireless charger in response to the transmitted connection solicitation.

17. The method of claim 16, wherein transmitting the connection solicitation comprises broadcasting the connection request via the wireless communications network.

18. The method of claim 16, further comprising charging based on the received power signal.

19. The method of claim 18, further comprising operating in one of a charger powered mode, in which not enough power is available to operate in a normal mode while charging, or a self-powered mode, in which enough power is available to operate in the normal mode while charging.

20. The method of claim 19, further comprising:
    operating in the charger powered mode; and
    transmitting a command to terminate the connection with the wireless charger when a sufficient amount of power is received to operate in the normal mode while charging, wherein the charger powered mode is supported by a first physical implementation and the self-powered mode is supported by a second physical implementation.

21. The method of claim 20, further comprising:
transitioning into the self-powered mode when a sufficient amount of power is received to operate in the normal mode while charging; and
transmitting a message to reestablish a connection with the wireless charger.

22. The method of claim 19, further comprising transitioning from the charger powered mode to the self-powered mode when a sufficient amount of power is received to operate in the normal mode while charging without terminating the connection with the wireless charger, wherein the charger powered mode is supported by a first physical implementation and the self-powered mode is supported by the first physical implementation.

23. The method of claim 19, further comprising receiving a command to initiate a charging operation when operating in the self-powered mode.

24. The method of claim 16, further comprising transmitting a charging report to the wireless charger via the wireless communications network, the charging report comprising a current charging level of a charging device.

25. The method of claim 24, further comprising receiving a stop charging command from the wireless charger via the wireless communications network, based on the transmitted charging report.

26. The method of claim 16, wherein transmitting the connection solicitation via the wireless communications network comprises transmitting the connection solicitation using a Bluetooth protocol.

27. The method of claim 16, wherein generating a connection solicitation comprises generating the connection solicitation comprising charging information associated with a charging service.

28. The method of claim 27, wherein the charging information comprises a target device address and a charging service type.

29. The method of claim 16, wherein receiving a connection request comprises receiving the connection request in a communication separate from the received power signal.

30. An apparatus for connecting with a wireless charger via a wireless communications network, the apparatus comprising:
means for receiving a power signal transmitted by the wireless charger, wherein receipt of the power signal causes the receiving means to be detectable by the wireless charger;
means for generating a connection solicitation in response to the power signal being received;
means for transmitting the connection solicitation via the wireless communications network; and
means for receiving a connection request to establish a connection with the wireless charger in response to the transmitted connection solicitation.

31. The apparatus of claim 30, wherein means for transmitting the connection solicitation comprises means for broadcasting the connection solicitation.

32. The apparatus of claim 30, further comprising means for charging based on the received power signal.

33. The apparatus of claim 30, wherein the means for receiving a power signal and the means for receiving a connection request comprise a receiver, wherein the means for generating comprises a processor, and wherein the means for transmitting comprises a transmitter.

34. A non-transitory computer-readable medium comprising code that, when executed, causes an apparatus to:
receive a power signal transmitted by a wireless charger, wherein receipt of the power signal causes the wireless charger to detect the apparatus;
generate a connection solicitation in response to the power signal being received;
transmit the connection solicitation via a wireless communications network; and
receive a connection request to establish a connection with the wireless charger in response to the transmitted connection solicitation.

* * * * *